United States Patent
Nonaka et al.

(10) Patent No.: US 9,288,428 B2
(45) Date of Patent: Mar. 15, 2016

(54) SHOOTING APPARATUS AND METHOD FOR CONTROLLING SHOOTING APPARATUS

(75) Inventors: Osamu Nonaka, Sagamihara (JP); Masaomi Tomizawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 1073 days.

(21) Appl. No.: 13/102,878

(22) Filed: May 6, 2011

(65) Prior Publication Data

US 2011/0279709 A1    Nov. 17, 2011

(30) Foreign Application Priority Data

May 11, 2010  (JP) ................................ 2010-109597
May 21, 2010  (JP) ................................ 2010-117638

(51) Int. Cl.

| | | |
|---|---|---|
| H04N 5/228 | (2006.01) | |
| H04N 5/77 | (2006.01) | |
| H04N 5/232 | (2006.01) | |
| H04N 5/235 | (2006.01) | |
| H04N 9/79 | (2006.01) | |

(52) U.S. Cl.
CPC ............. *H04N 5/772* (2013.01); *H04N 5/232* (2013.01); *H04N 5/235* (2013.01); *H04N 5/23232* (2013.01); *H04N 9/7921* (2013.01)

(58) Field of Classification Search
CPC ... H04N 5/232; H04N 5/23232; H04N 5/772; H04N 5/235; H04N 9/7921
USPC .......... 348/333.02, 333.05, 33.11, 220.1, 362
See application file for complete search history.

(56) References Cited

U.S. PATENT DOCUMENTS

| | | | |
|---|---|---|---|
| 2002/0118293 A1* | 8/2002 | Hori et al. ..................... | 348/362 |
| 2009/0231449 A1* | 9/2009 | Tzur et al. .................. | 348/208.6 |
| 2010/0177215 A1* | 7/2010 | Kita ............................. | 348/234 |

FOREIGN PATENT DOCUMENTS

| | | |
|---|---|---|
| JP | 2765642 | 4/1998 |
| JP | 2006-033241 | 2/2006 |
| JP | 2008-017500 | 1/2008 |
| JP | 2008-124671 | 5/2008 |
| JP | 2008-193342 | 8/2008 |
| JP | 2009-111635 | 5/2009 |

OTHER PUBLICATIONS

Office Action from corresponding Japanese Patent Application No. 2010-109597, mailed Feb. 4, 2014 (3 pgs.).

* cited by examiner

*Primary Examiner* — Twyler Haskins
*Assistant Examiner* — Carramah J Quiett
(74) *Attorney, Agent, or Firm* — John C. Pokotylo; Straub & Pokotylo

(57) ABSTRACT

A camera includes: a shooting section that outputs images of an object; a moving image shooting control section that controls the shooting section to repeat shooting under predetermined shooting conditions at a predetermined frame rate; a moving image generation section that generates moving images based on images shot under the predetermined shooting conditions, respectively; an image extraction section that extracts a first image and a second image based on a predetermined condition from each of the moving images; a display section; and a display control section that performs control to simultaneously multi-display the first image and the second image of each moving image on the display section.

15 Claims, 17 Drawing Sheets

SHOOTING APPARATUS AND METHOD FOR CONTROLLING SHOOTING APPARATUS

CROSS REFERENCE TO RELATED APPLICATION

This application claims benefit of Japanese Applications No. 2010-109597 filed in Japan on May 11, 2010, and No. 2010-117638 filed in Japan on May 21, 2010, the contents of which are incorporated by this reference.

BACKGROUND OF THE INVENTION

1. Field of the Invention

The present invention relates to a shooting apparatus capable of shooting moving images, and a method for controlling the shooting apparatus.

2. Description of the Related Art

A digital camera is provided with a function of automatically controlling various shooting conditions. Unfortunately, an image shot under automatic control may not necessarily be an image as intended by the shooting person. For example, an image shot at an automatically set amount of exposure may be brighter or darker than intended by the shooting person. As such, Japanese Patent Application Laid-Open Publication No. 2009-111635 discloses a camera with bracket shooting mode, in which still images are successively shot while a shooting condition such as an amount of exposure is varied stepwise.

In bracket shooting mode, for example, a first image is shot with an optimum control value determined under automatic control, and two images are further shot under conditions with control values shifted positively and negatively from the optimum control value, respectively. Through the bracket shooting, the shooting person can obtain an image that matches the person's intension best among the three images.

Due to digitization of shooting technologies, cameras capable of shooting moving images as well as still images are available. In still image shooting, states of an object, such as the luminosity and color tone, can be checked before the shooting. In moving image shooting, however, various changes may occur in an object during the shooting.

With a recent increase in the number of female camera users, moving images of daily experiences, for example a cooking process, are increasingly shot. For example, as shown in FIGS. 1A and 1B, a moving image of grilling meat may be shot. Unfortunately, it is not easy to set shooting conditions (such as an aperture and an exposure time) at the start of the shooting by predicting an image 28A2 in which the grilling is finished as shown in FIG. 1B from an image 28A1 in which the grilling is started as shown in FIG. 1A. In addition, the meat 91 undergoes changes in color etc. with changes in its doneness, and the changing part (the meat 91) is an unspecified, small part in the screen. If automatic control is performed to set optimum shooting conditions for the part of the meat 91, the luminosity and color tone of objects other than the meat 91, for example a person 92 and a background 93, are changed with the changes of the shooting conditions.

That is, when an object becomes brighter or darker during moving image shooting, automatic control is performed so that a moving image with constant luminosity is obtained regardless of the changes in luminosity.

Japanese Patent No. 2765642 discloses an exposure control device for a video camera, with which a bright object is shot relatively brighter and a dark object is shot relatively darker by correcting an automatic control condition by an amount of correction smaller than an optimum amount of correction for luminosity changes of the object.

SUMMARY OF THE INVENTION

A shooting apparatus in an embodiment includes: a shooting section that outputs images of an object; a moving image shooting control section that controls the shooting section to repeat shooting under a plurality of predetermined shooting conditions at a predetermined frame rate; a moving image generation section that generates a plurality of moving images based on a plurality of images shot under the predetermined shooting conditions, respectively; an image extraction section that extracts a first image and a second image based on a predetermined condition from each of the plurality of moving images; a display section; and a display control section that performs control to simultaneously multi-display the first image and the second image of each moving image on the display section.

A shooting apparatus in another embodiment includes: a detection section that detects luminosity of an object; a shooting section that shoots the object at a predetermined frame rate and outputs a moving image formed of a plurality of images; a condition control section that controls a value of an exposure condition to fall within a dynamic range of the shooting section depending on the luminosity of the object detected by the detection section; a condition storage section that stores the value of the exposure condition for each of the images under control of the condition control section; and a correction section that performs luminosity correction processing based on the value of the exposure condition for each of the images stored in the condition storage section, wherein a bright image of the object is made brighter and a dark image of the object is made darker in the luminosity correction processing.

A shooting apparatus in still another embodiment includes: a detection section that detects luminosity of an object; a condition control section that controls an exposure condition depending on the luminosity of the object detected by the detection section; a shooting section that shoots the object at a predetermined frame rate under control of the condition control section and outputs a moving image formed of a plurality of images; a condition storage section that stores the exposure condition for each of the images; a correction section that performs luminosity correction processing based on the exposure condition for each of the images stored in the condition storage section, wherein a bright image of the object is made brighter and a dark image of the object is made darker in the luminosity correction processing; a moving image shooting control section that controls the shooting section to repeat shooting under predetermined shooting conditions at a predetermined frame rate; and a storage section that stores a moving image generated by a moving image generation section based on images shot under any one of the predetermined shooting conditions.

DETAILED DESCRIPTION OF THE PREFERRED EMBODIMENTS

First Embodiment

Figure 2:
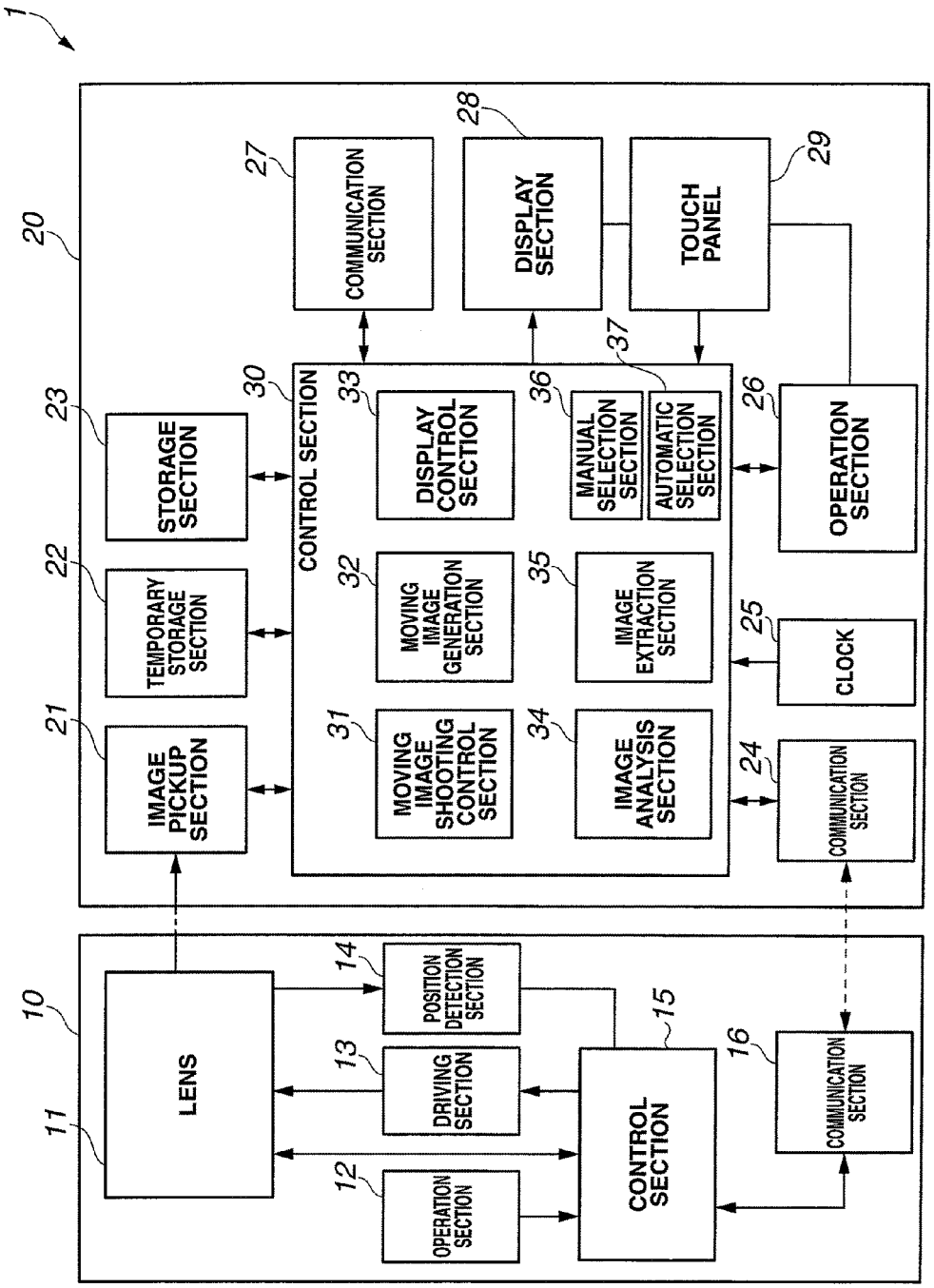
FIG. 2 is a schematic diagram of a camera in a first embodiment.

A camera 1 capable of shooting moving images, which is a shooting apparatus in a first embodiment, will be described below. As shown in FIG. 2, the camera 1 has an interchangeable lens 10 and a body 20. Although the camera 1 is not limited to a camera with an interchangeable lens, the following description takes the camera 1 with the interchangeable lens as an example. The interchangeable lens 10 of the camera 1 is a general-purpose product and therefore will be briefly described.

The interchangeable lens 10 includes a lens 11, an operation section 12, a driving section 13, a position detection section 14, a control section 15, and a communication section 16. The lens 11 is a zoom lens for example, which includes optical members and a diaphragm. A user's operation is conveyed to the control section 15 through the operation section 12, and the driving section 13 drives the lens 11 to adjust an aperture value (an F value), a focus, an angle of view (a zoom state), etc., of the lens 11. The zoom state, the focusing state, and the aperture of the lens 11 are detected by the position detection section 14. The states of the lens 11 are sent to the body 20 through the communication section 16. Interchangeable lenses other than the lens 10 shown can also be attached to the camera 1. When a lens that is not a zoom lens is attached to the camera 1, a component such as a focusing ring (not shown) corresponds to the operation section 12.

The body 20 includes an image pickup section 21 that is shooting means, a moving image shooting control section 31 that is moving image shooting control means, a moving image generation section 32 that is moving image generation means, a display control section 33 that is display control means, a temporary storage section 22 that is temporary storage means, an image analysis section 34 that is image analysis means, an image extraction section 35 that is image extraction means, a manual selection section 36 that is manual selection means, an automatic selection section 37 that is automatic selection means, a storage section 23 that is storage means, a display section 28 that is display means with a touch panel 29, the touch panel 29 and an operation section 26 that are input means, a clock 25, and a communication section 24. Each component of the body 20 may not be independent hardware. For example, components such as the moving image shooting control section 31 may be implemented in such a manner that a program stored in a storage section such as ROM or in a storage medium (not shown) is read by a CPU to perform functions of the respective components. That is, the CPU may implement a control section 30, which may have the functions of the respective components as functions of the control section 30.

The image pickup section 21 shoots an image of an object through the lens 11 and outputs the shot image. The moving image shooting control section 31 controls the image pickup section 21 to repeat shooting under several predetermined shooting conditions at a predetermined frame rate. The moving image generation section 32 generates a moving image from images shot under the predetermined shooting conditions. The display control section 33 performs control to simultaneously multi-display live view images under the different shooting conditions on the display section 28 during the shooting. The image analysis section 34 analyzes brightness values of the images that form the moving images. The image extraction section 35 extracts a first image with the highest maximum brightness value and a second image with the lowest minimum brightness value from the moving images based on the result of the image analysis section 34.

The display control section 33 performs control to simultaneously multi-display the first image and the second image under each different shooting condition on the display section 28 after the shooting. The manual selection section 36 selects any one of the moving images based on the first image and the second image displayed on the display section 28 according to the user's instruction provided through means such as the touch panel 29. In contrast, the automatic selection section 37 automatically selects a moving image from the shot moving images such as when the manual selection section 36 does not receive an instruction from the user for a predetermined period. The automatically selected moving image is such that the brightness values of the first image are below a saturated brightness value, and the difference in the brightness values between the first image and the second image is the largest. The storage section 23 stores the moving image selected by the manual selection section 36 or the automatic selection section 37. The camera 1 can be connected to other external devices through a communication section 27, so that images can be displayed on a television, for example.

Figure 3:
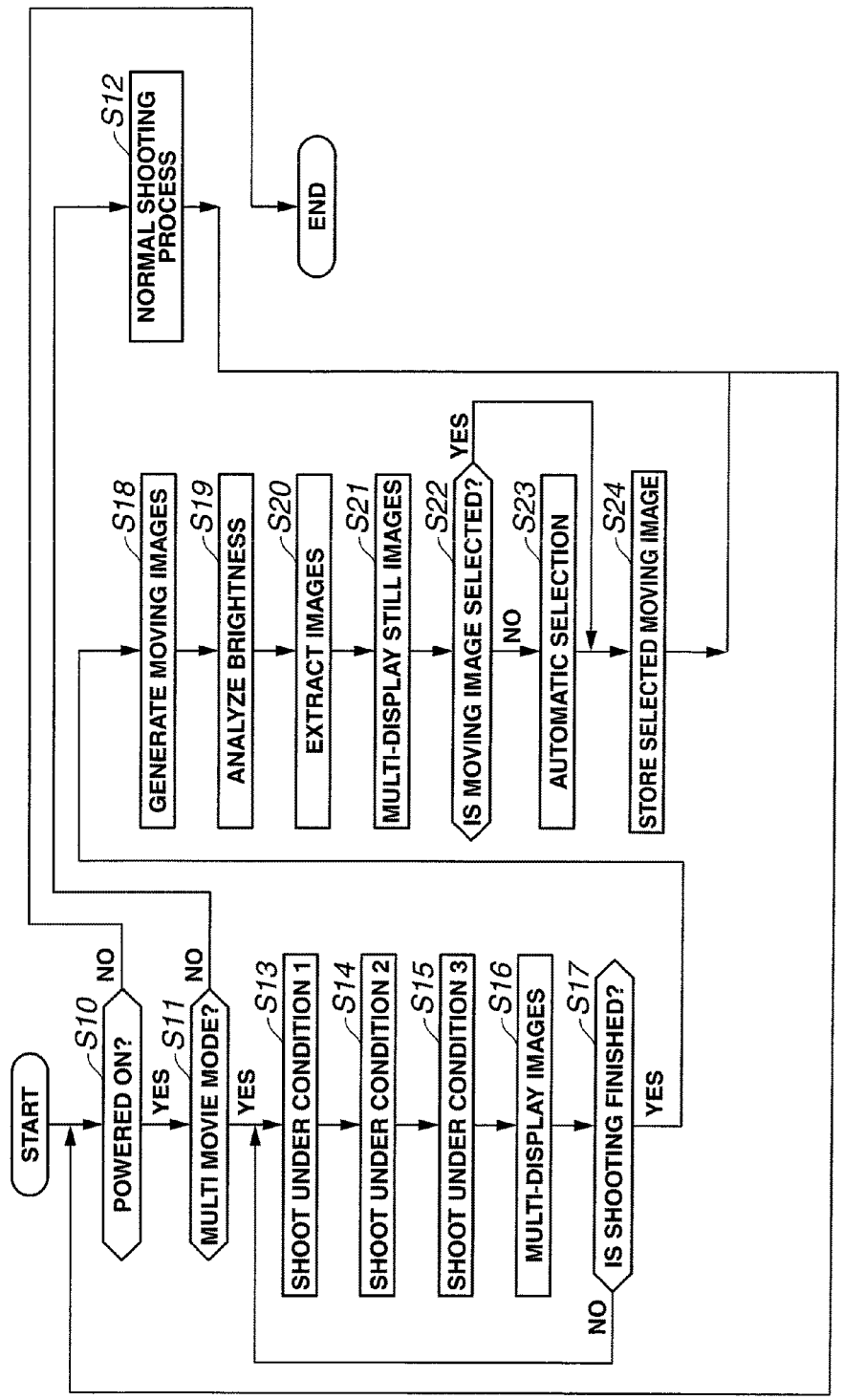
FIG. 3 is a flowchart for describing a flow of operation of the camera in the first embodiment.

Now, a process flow in the camera 1 will be described with reference to a flowchart in FIG. 3.

<Step S10> Power On

The operation starts if the camera 1 is powered on (Yes) and ends if the camera 1 is powered off (No).

<Step S11> Initial System Setting

If shooting operation mode is multi movie mode, i.e., bracket movie shooting mode (Yes), a process from S13 is performed. Otherwise (No), a normal shooting process from S12 is performed.

<Steps S13 to S15> Shooting under Conditions 1 to 3

By way of example, the moving image shooting control section 31 controls the image pickup section 21 to repeat shooting under three shooting conditions A, B, and C at a predetermined frame rate. The shooting conditions A, B, and C here illustratively include the condition B at a standard exposure, the condition A at a positively shifted exposure (e.g., twice the amount of exposure), and the condition C at a negatively shifted exposure (e.g., a quarter of the amount of exposure).

The exposure conditions are determined using a known photometric scheme (evaluative metering, center-weighted averaging metering, or spot metering). For shooting of a person, a correct exposure condition may be set for a face part detected with a face detection system. Further, the user may touch the touch panel displaying a live view image with a finger to cause light in a certain area in the screen to be measured.

Figure 1A:
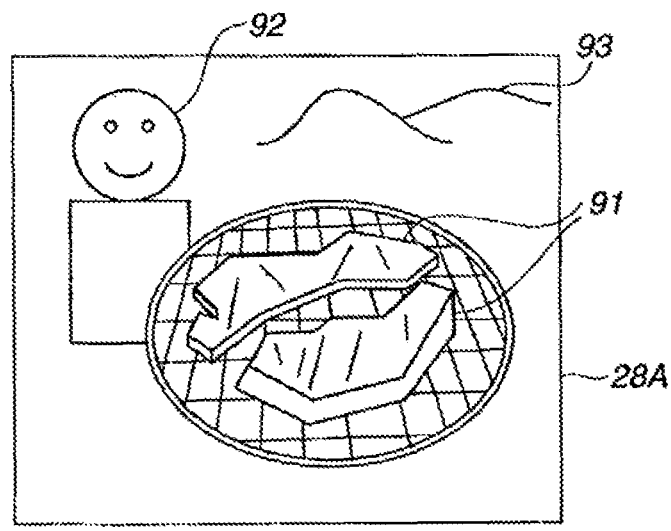
FIG. 1A is an illustrative diagram for describing an image at the start of shooting a moving image.
Figure 1B:
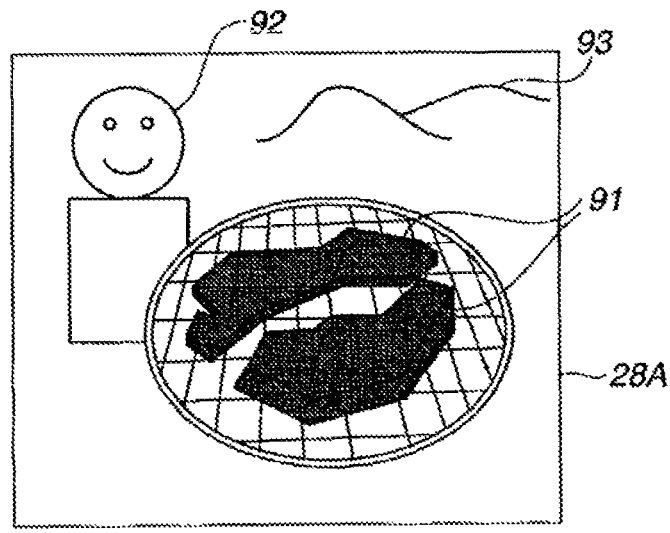
FIG. 1B is an illustrative diagram for describing an image at the end of shooting the moving image.

For example, when a moving image of grilling meat as shown in FIG. 1 is to be shot, the user may sequentially touch the part of the meat 91 and the part of the person 92 in a live view image, so that a correct exposure condition may be set for the designated two areas, i.e., the meat 91 and the person 92.

The camera 1 then sequentially repeats shooting under the shooting conditions A, B, and C at the predetermined frame rate to obtain moving images. For example, for shooting under the three shooting conditions A, B, and C at a frame rate of 60 frames/sec per moving image, the image pickup section 21 performs shooting at a frame rate of 180 frames/sec.

The number of shooting conditions and the frame rate may be variable according to the user's setting. That is, in a case where the user puts importance on the exposure time, the shooting may be performed at a reduced frame rate if the total exposure time under the three shooting conditions is not less than 1/60 of a second. The user may also reduce the frame rate for saving the storage capacity. The moving images may be shot under four or more shooting conditions.

Figure 4A:
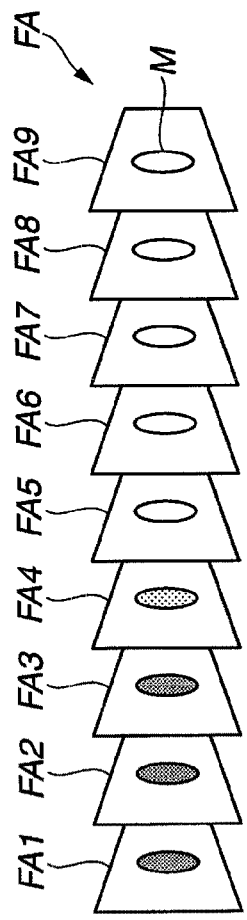
FIG. 4 is an illustrative diagram for describing images that form moving images shot by the camera in the first embodiment.
Figure 4B:
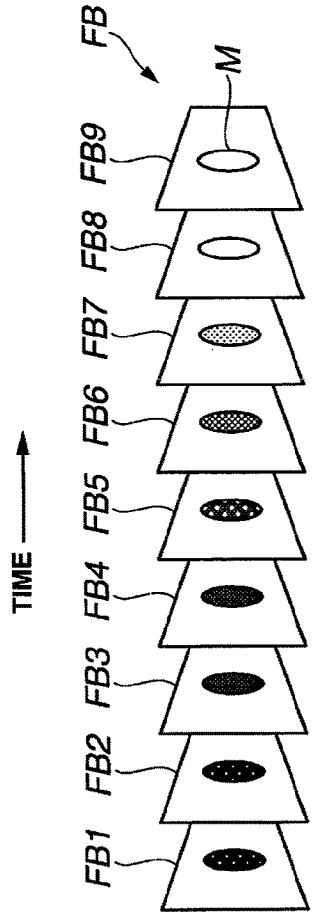
Figure 4C:
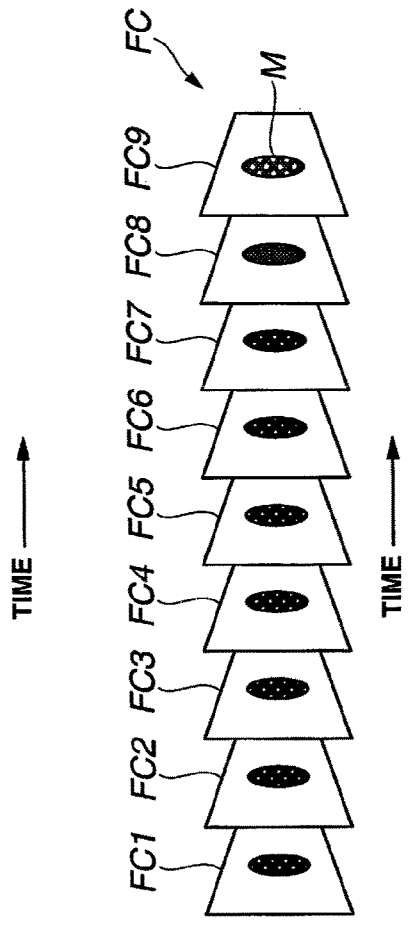

FIG. 4 is a diagram for describing shot images under the shooting conditions A, B, and C. FIG. 4A shows images FA at twice the amount of exposure, FIG. 4B shows images FB at the standard amount of exposure, and FIG. 4C shows images FC at a quarter of the amount of exposure. These figures conceptually show that the images are obtained chronologically toward the right.

<Step S16> Multi-Display Images

Figure 5:
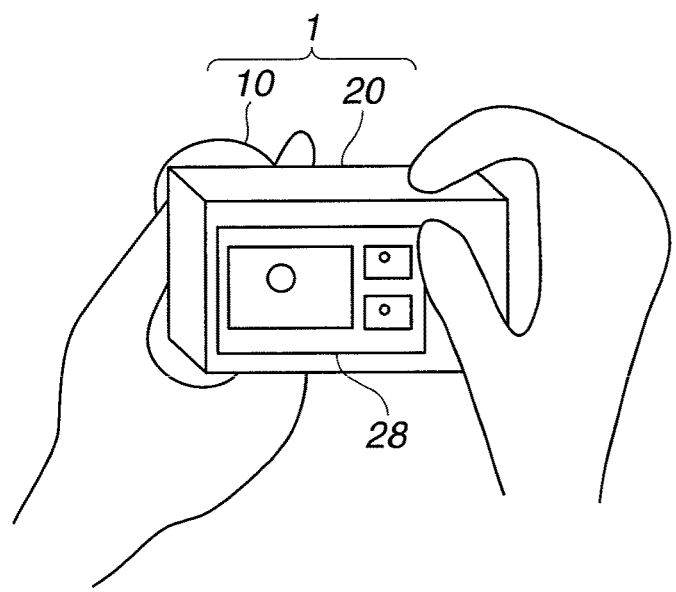
FIG. 5 is an illustrative diagram for describing the way the camera is used in the first embodiment.
Figure 6:
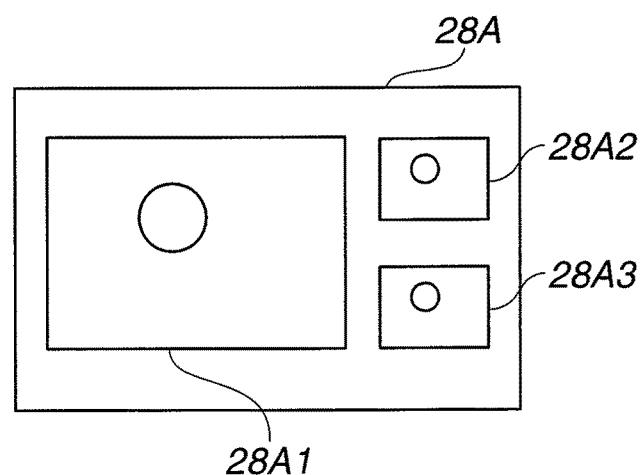
FIG. 6 is an illustrative diagram for describing a display surface of a display section of the camera in the first embodiment.

The display control section 33 performs control to simultaneously multi-display three live view images (through-the-lens images) being shot under the three shooting conditions A, B, and C on the display section 28. For example, FIGS. 5 and 6 illustrate a display screen 28A of the display section 28, in which the images FB at the standard amount exposure are displayed in a display area 28A1, the images FA at twice the amount of exposure are displayed in a display area 28A2, and the images FC at a quarter of the amount of exposure are displayed in a display area 28A3.

Since the user can check the live view images during the shooting, the user can stop the shooting if none of the shooting conditions are appropriate. The live view images here are images being shot, which are each stored in the temporary storage section 22.

In multi movie mode, even before the start of shooting, the display control section 33 may perform control so that live view images under the three shooting conditions A, B, and C not stored in the temporary storage section 22 are simultaneously multi-displayed on the display section 28.

<Step S17> Is Shooting Finished?

The process from the step S13 is repeated until the user instructs the finish of the shooting (Yes).

<Step S18> Generate Moving Images

Based on the images stored in the temporary storage section 22, the moving image generation section 32 generates moving images AFA, AFB, and AFC under the three predetermined shooting conditions, respectively. The moving image generation section 32 may generate a moving image from only selected images to be stored in the storage section 23, after a selection process to be described later. That is, after the shooting is finished or before images are stored in the storage section 23, the moving image generation section 32 generates the moving image(s) from the images shot under the predetermined condition(s).

<Step S19> Analyze Images

Figure 7A:
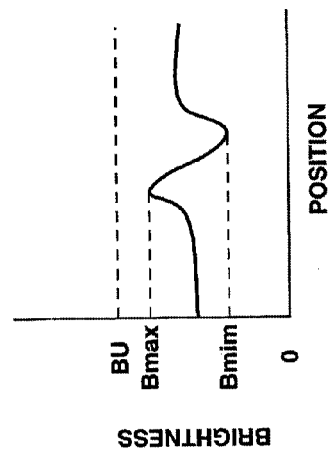
FIG. 7 is an illustrative diagram for describing operation of a brightness analysis section of the camera in the first embodiment.
Figure 7B:
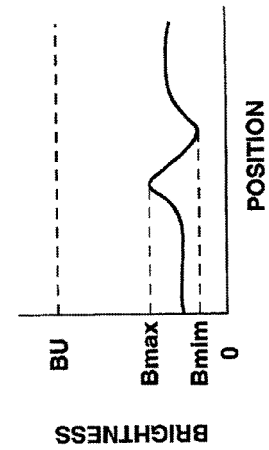
Figure 7C:
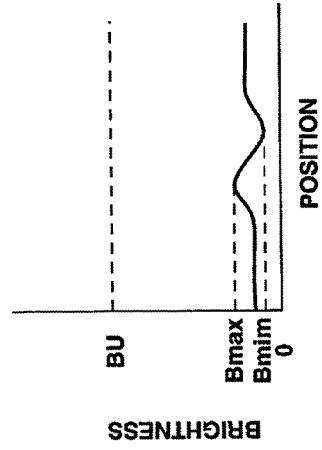
Figure 7D:
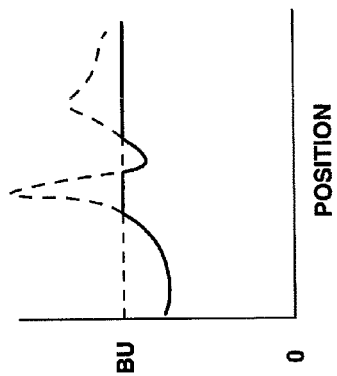
Figure 7E:
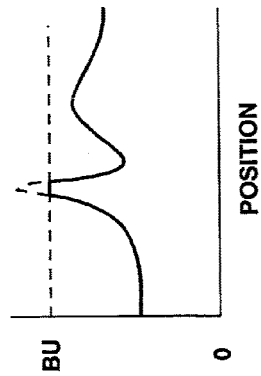
Figure 7F:
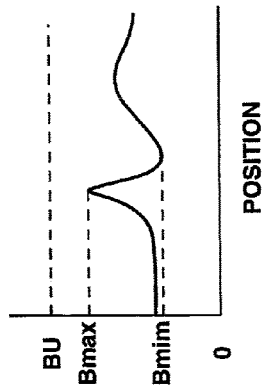

The image analysis section 34 analyzes brightness values of the images FA1 to FA9, FB1 to FB9, and FC1 to FC9 that form the moving images AFA, AFB, and AFC. FIGS. 7A to F show the brightness at the center of the images, where FIG. 7A represents the image FA1, FIG. 7B represents the image FB1, FIG. 7C represents the image FC1, FIG. 7D represents the image FA9, FIG. 7E represents the image FB9, and FIG. 7F represents the image FC9.

The luminosity (brightness) of an object M takes optimum values in the image FB1 among the images FA1, FB1, and FC1 at the beginning of the shooting. The luminosity (brightness) then takes optimum values in the image FB9 among the images FA9, FB9, and FC9 with respect to the entire screen. However, at the end of the shooting, the images FA9 and FB9 are overexposed. That is, these images exhibit incorrect brightness and colors due to the brightness values exceeding a saturated brightness value BU of pixels of the image pickup section 21.

The brightness values here are either white brightness values, or red, green, and blue brightness values. If a single type of brightness values is to be selected, white brightness values are preferable. If importance is put on the color, in other words, in "color change mode," red, green, and blue brightness values are preferable to be selected as types of brightness values. In the latter case, the image analysis section 34 analyzes red, green, and blue brightness values of each image. In this manner, the camera 1 can detect changes in a specific color regarded important by the user and prevent saturation and blackout of that specific color, so that a moving image rendered according to the user's preference can be generated.

Besides analyzing pixels of the images in the entire screen, the image analysis section 34 may analyze only the center of the screen or only an area designated by the user, as in the above-described exposure condition determination. The user preferably designates the area by touching the screen of the display section 28 displaying the images with a finger through the touch panel 29.

The image analysis section 34 may analyze only a part on which the user focuses attention. For example, under an exposure condition that allows reproducing the color of a bird perching on a branch of a tree, a bright sky in the background may be overexposed. The above approach enables shooting with importance put on the color of the bird.

The image analysis may be performed for, e.g., every nine pixels rather than for all pixels in the area, thereby enabling fast processing.

Further, from the result of the analysis, the user can readily determine which images in which of the shot moving images are overexposed.

<Step S20> Extract Images

Based on the result of the analysis by the image analysis section 34, the image extraction section 35 extracts a first image with the highest maximum brightness value Bmax and a second image with the lowest minimum brightness value Bmin from each of the moving images AFA, AFB, and AFC. Conventionally, the user has to replay moving images if the user wants to check changes in luminosity of the shot images immediately after shooting. Extracting the two images (the first image and the second image) with the largest amount of change allows the user to make an immediate determination.

In the example shown in FIGS. 4 and 7, for example, the image FA9 is extracted as the first image and the image FA1 is extracted as the second image from the moving image AFA. Thus, for prioritizing a selection according to the user's determination, the image extraction section 35 extracts the image FA9 even though the image is overexposed.

The user can preferably select to cause the image extraction section 35 to extract, as the first image, an image with the highest brightness among images except overexposed images.

In the case where the image analysis section 34 has analyzed the red, green, and blue brightness values of each image, the image extraction section 35 may use the average of the three brightness values or may use the maximum or minimum of the three brightness values.

Although the initial image is the second image and the last image is the first image in the above example, it is to be understood that images in the middle of the shooting may often be the first image and the second image.

Only the maximum brightness Bmax may be used for the extraction of the first image and the second image, so that the first image with the highest Bmax and the second image with the lowest Bmax may be extracted. The extraction may be based on the brightness in a certain area in the screen. Further, the extraction may utilize a brightness change rate, or a brightness change above a predetermined amount. The certain area in the screen is the center or a marginal area, or a designated area in the screen. The extraction may be based on a brightness change in a designated object, as will be described later.

<Step S21> Multi-Display Still Images

Figure 8:
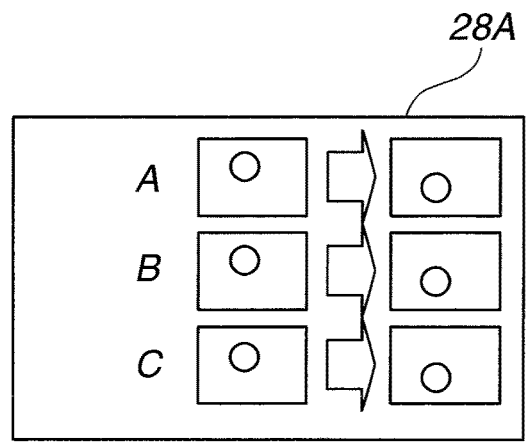
FIG. 8 is an illustrative diagram for describing the display surface of the display section of the camera in the first embodiment.

The display control section 33 performs control to simultaneously multi-display the first images and the second images under the three different shooting conditions A, B and C on the display section 28. As shown in FIG. 8, the six images under the shooting conditions A, B, and C are multi-displayed in the display screen 28A.

Information such as the number of images containing overexposed areas and the positions in each moving image (frame numbers) of the images containing the overexposed areas may also be displayed in the display screen 28A.

<Step S22> Is Moving Image Selected?

In response to the user designating one of the three moving images displayed on the display section 28 through, e.g., the touch panel 29 (Yes), the manual selection section 36 selects the moving image. In other words, the user selects a moving image that matches the user's intention.

<Step S23> Automatic Selection

If, for example, the manual selection is not performed within a predetermined period or automatic selection is instructed by the user (S22: No), the automatic selection section 37 automatically selects one of the moving images. At this point, the automatic selection section 37 selects a moving image such that the brightness values of the first image are below the saturated brightness value, and the difference in the brightness values between the first image and the second image is the largest. That is, the automatic selection section 37 selects a moving image with the largest amount of change.

In the case where the image analysis section 34 has analyzed the red, green, and blue brightness values of each image, the image extraction section 35 selects a moving image such that the first image has all the brightness values of the three colors below saturated brightness values and the difference in the brightness values between the first image and the second image is the largest.

As an example, an image that maximally renders changes in color etc. at sunset is selected. As another example, an image is selected that maximally renders changes in color tone such as when the user wants to shoot how the color of a bird flitting from branch to branch of a backlit tree changes in the shade of leaves and in the sunlight.

Rather than a moving image with the largest difference in the brightness values between the first image and the second image, a moving image with the most frequent luminosity changes between the first image and the second image may be selected. In this manner, a moving image is selected with importance put on color transitions of the object.

Information such as the number of images containing overexposed areas and the positions in each moving image (frame numbers) of the images containing the overexposed areas may also be used by the automatic selection section 37 in the selection process.

<Step S24> Store Moving Image

The moving image selected by the manual selection section 36 or the automatic selection section 37, i.e., the moving image under a shooting condition that matches the user's intention, is stored in the storage section 23. At this point, the moving image to be stored may be compressed by a moving image compression section (not shown) before being stored.

In the above description, the image extraction section 35 extracts the first image and the second image based on the result of the analysis by the image analysis section 34. Alternatively, the image extraction section 35 may extract the first image and the second image from each of the predetermined shooting conditions A, B, and C based on a predetermined condition. For example, the image extraction section 35 may extract the initial image as the first image, and the last image as the second image. Images, for example overexposed images, selected based on the result of the brightness analysis may also be displayed.

The image extraction section 35 may extract the first image and the second image of each moving image with the largest amount of change, in other words, with a sharp change. Alternatively, the image extraction section 35 may extract the first image and the second image of each moving image with a large amount of change relative to time, in other words, with a large differential value of the amount of change. The shooting condition is not limited to the exposure time but may be a condition such as an aperture state.

As described above, the camera 1 in the present embodiment shoots and stores a moving image under a shooting condition that matches the user's intention.

Thus, a method for controlling a shooting apparatus in the present embodiment includes: a shooting step by a shooting section of repeating, at a predetermined frame rate, a first shooting substep of outputting images of an object under a first shooting condition, a second shooting substep of outputting images of the object under a second shooting condition, and a third shooting substep of outputting images of the object under a third shooting condition; a moving image generation step of generating a first moving image based on the images shot in the first shooting substep, generating a second moving image based on the images shot in the second shooting substep, and generating a third moving image based on the images shot in the third shooting substep; an image extraction step of extracting a first image and a second image from each of the moving images based on a predetermined condition; and a display control step of simultaneously multi-displaying the first image and the second image of each moving image on a display section.

During the shooting, the image multi display for simultaneously multi-displaying the live view images may not be performed, but only any one of the live view images may be displayed.

The luminosity of the object to be shot may be initially identified, and in the following shooting, the exposure may be controlled under shooting conditions based on the initially identified luminosity. This allows obtaining moving images with more emphasis on changes in luminosity of the object.

Although the three moving images shot under the three shooting conditions have been taken as an example in the above description, the number of shooting conditions may be two, or more than three.

Second Embodiment

Now, a camera 1A in a second embodiment of the present invention will be described. Since the camera 1A is similar to the camera 1, like components will be given like symbols and will not be described.

Figure 9:
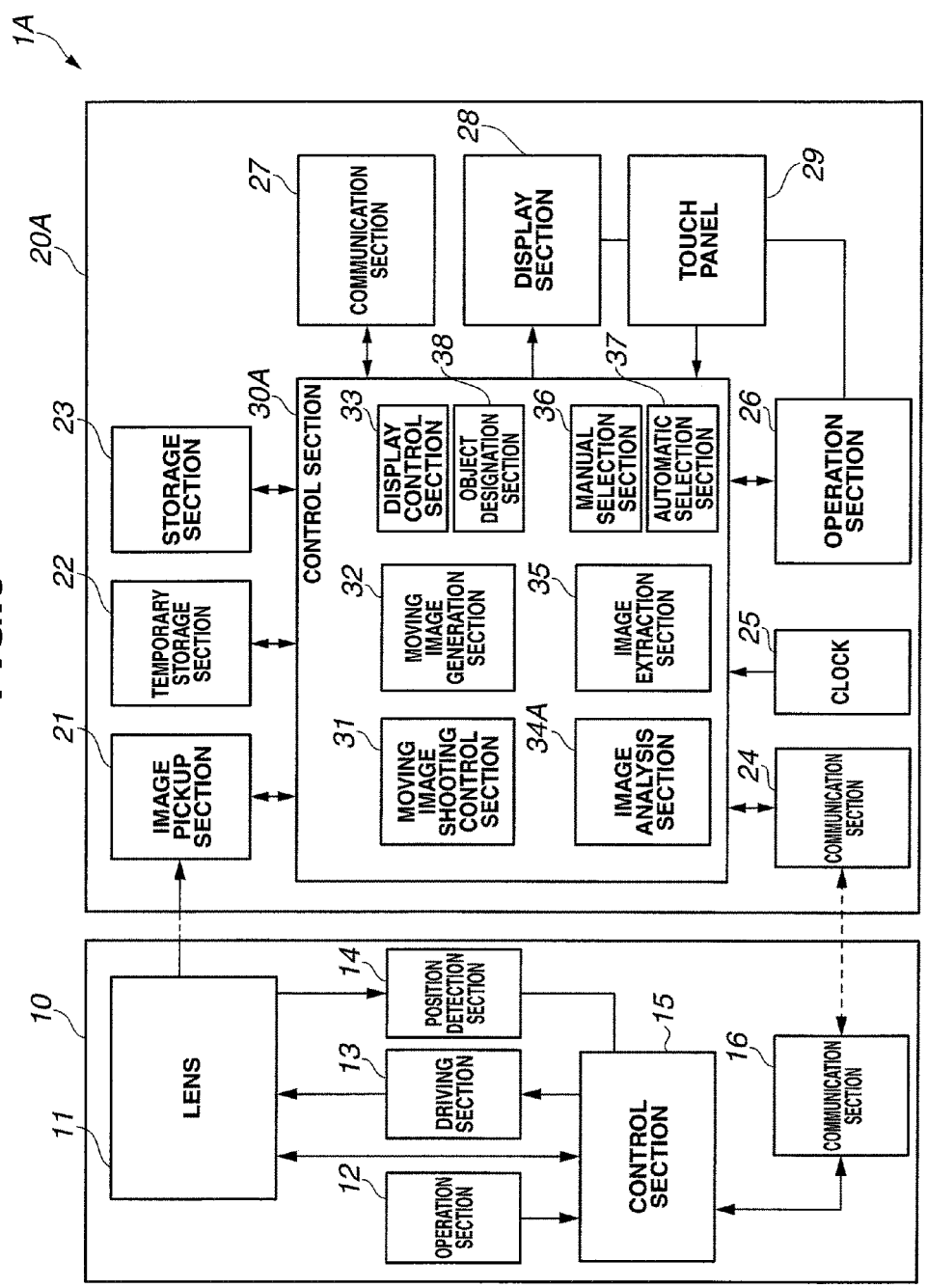
FIG. 9 is a schematic diagram of a camera in a second embodiment.

As shown in FIG. 9, the camera 1A includes an object designation section 38 in a control section 30A in a body 20A. The object designation section 38 is object designation means through which a user designates a specific object in a live view image displayed on a display section 28 before shooting. An image analysis section 34A analyzes an image area that includes the specific object designated through the object designation section 38 in each picked up image.

Figure 10:
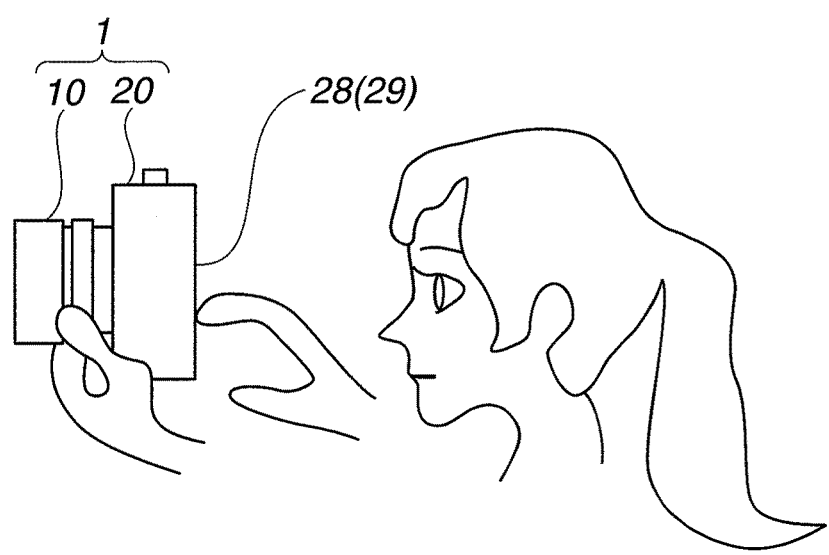
FIG. 10 is an illustrative diagram for describing the way the camera is used in the second embodiment.

Specifically, as in a case where a moving image of the sun setting over the horizon is shot, an object of shooting may move in the screen over time. In such a case, as shown in FIG. 10, the user designates the sun as the specific object in a live view image on the camera 1A by touching a touch panel 29 with a finger before starting the shooting. Then the moving image shooting is started so that an optimum exposure state appropriate for rendering the setting sun is set. The image analysis section 34A detects the part of the sun in each shot image and analyzes brightness values in the area.

For example, the object designation section 38 identifies the shape, color, or brightness specific to the object image in the area designated by the user through the touch panel 29, and detects how the position of similar patterns in the sequentially obtained images moves. The result of the detection is stored in a temporary storage section 22 along with the images.

Once the image analysis section 34A analyzes the image in the area of the shot sun in each image, the user or an automatic selection section 37 can select a moving image that includes images with the largest amount of change in the color of the sun. The user may designate two or more areas.

When the specific object designated by the object designation section 38 disappears from the screen during the shooting, for example when the sun sets below the horizon, the camera 1A informs the user and asks the user for determination whether to continue or stop the shooting.

As described above, in addition to the advantages of the camera 1, the camera 1A in the present embodiment provides an advantage of the ability to shoot a moving image that matches the user's intention with attention focused on an object image in a small part of the screen.

Third Embodiment

Figure 11:
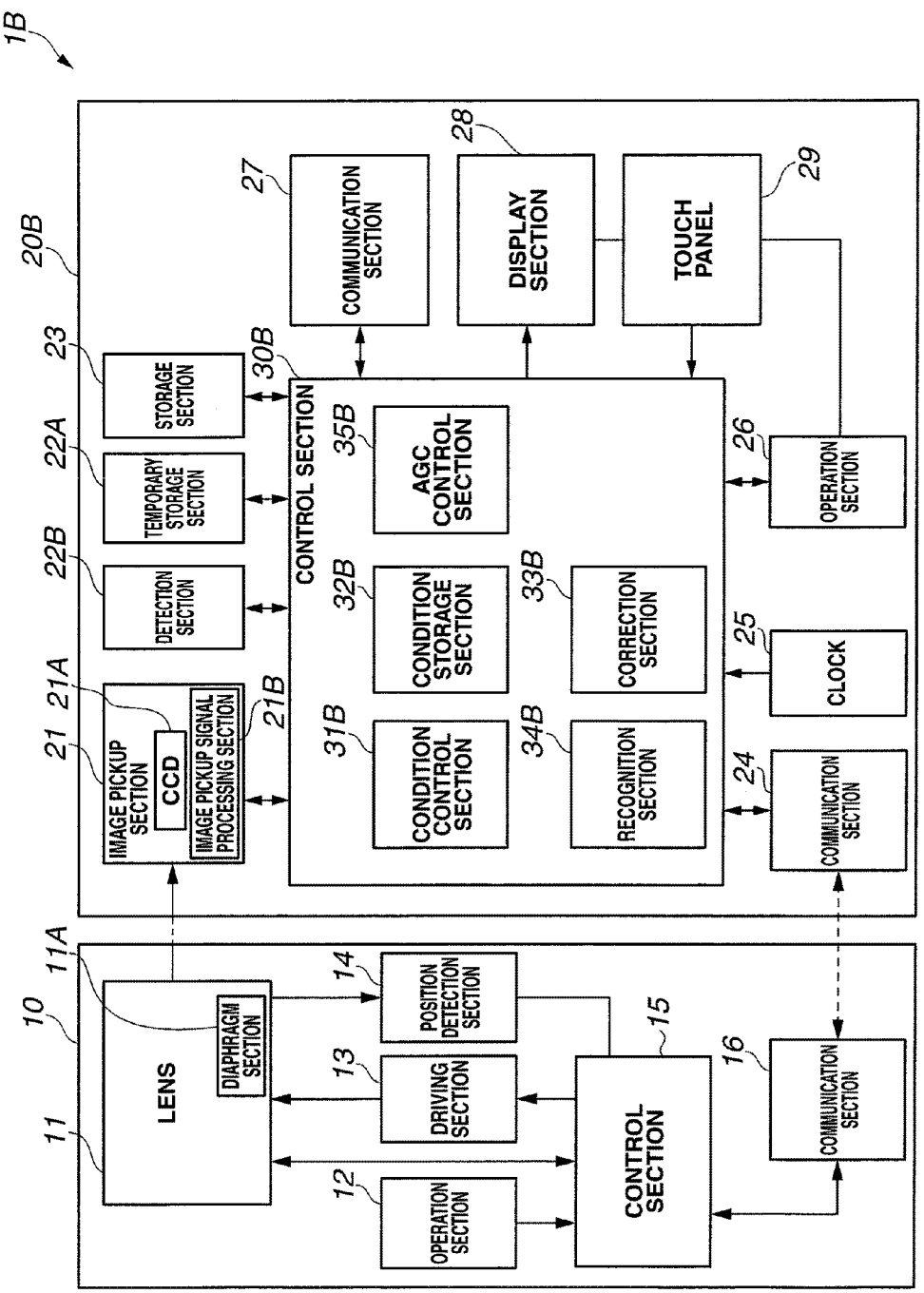
FIG. 11 is a schematic diagram of a camera in a third embodiment.

Now, a camera 1B capable of shooting moving images, which is a shooting apparatus in a third embodiment, will be described below. Since the camera 1B is similar to the camera 1, like components will be given like symbols and will not be described. As shown in FIG. 11, the camera 1B has an interchangeable lens 10 and a body 20B.

The body 20B includes an image pickup section 21 that is shooting means, a detection section 22B that is detection means, a condition control section 31B that is condition control means, a temporary storage section 22A that temporarily stores shot images, a condition storage section 32B that is condition storage means, a correction section 33B that is correction means, a recognition section 34B that is recognition means, an AGC (Auto Gain Control) control section 35B, a storage section 23 that is storage means, a display section 28 that is display means, a touch panel 29 and an operation section 26 that are input means, a clock 25, and a communication section 24.

Each component of the body 20B may not be independent hardware. For example, components such as the condition control section 31B may be implemented in such a manner that a program stored in a storage section such as ROM or in a storage medium (not shown) is read by a CPU to perform functions of the respective components. That is, the CPU may implement a control section 30B, which may have the functions of the respective components as functions of the control section 30B.

The image pickup section 21 includes a CCD 21A that is a solid-state image pickup device for shooting an object through the lens 11, and an image pickup signal processing section 21B for processing an image pickup signal and outputting an image signal. The CCD 21A outputs a color image pickup signal by detecting light of three colors of red (R), green (G), and blue (B) through different devices, respectively. The solid-state image pickup device may be a device such as a CMOS image pickup device. The image pickup section 21 repeats shooting at a predetermined frame rate to output a moving image formed of a number of images. An image pickup sensitivity corresponding to an ISO sensitivity of a film depends on specifications of the CCD 21A, the amplification rate for an image pickup signal according to the image pickup signal processing section 21B, etc. The images outputted by the image pickup section 21 are temporarily stored in the temporary storage section 22A.

The detection section 22B detects luminosity of the object, i.e., measures light of the object. Although white light is typically measured, light of three colors of red (R), green (G), and blue (B) may be separately measured as will be described later.

The condition control section 31B controls an exposure condition depending on the luminosity of the object detected by the detection section 22B. For example, the condition control section 31B outputs an exposure correction signal depending on the luminosity of the object to the driving section 13 and the AGC control section 35B to control the amount of exposure to fall within a dynamic range of the CCD 21A. Specifically, with the exposure correction signal, the condition control section 31B controls operations of increasing and decreasing the aperture by a diaphragm section 11A driven by the driving section 13, the amplification rate in amplification processing for image pickup signals performed by the AGC control section 35B, and the exposure time (the shutter speed).

By way of example, the exposure correction signal is a signal based on a measured value of the amount of white light, and it is a combination of an Ev (Exposure Value) value and an image pickup sensitivity. It is assumed here that, for an image pickup sensitivity corresponding to ISO100, a shutter speed of $1/250$ sec, and an F value of 5.6, the correct exposure is achieved with the Ev value=13. An image pickup sensitivity corresponding to ISO400 is two stages higher than the image pickup sensitivity corresponding to ISO100. Accordingly, the Ev value for the image pickup sensitivity corresponding to ISO400 is 15 resulting from adding 2. Thus, when Ev=15 and the F value=5.6, the shutter speed for the correct exposure is $1/1000$ sec.

For simplicity of illustration, the following description will be made for a case where the image pickup sensitivity and the shutter speed are fixed to certain values, for example the sensitivity corresponding to ISO100 and the shutter speed $1/250$ sec. Therefore the exposure correction signal, which is the exposure condition, is the aperture value (the F value) of the diaphragm section 11A.

The condition storage section 32B stores the exposure correction signal, i.e., the F value, which is the exposure condition for each image that forms the moving image. The condition storage section 32B may store the F values for all the images, for every predetermined number of images, or only for images with the F value changed by a predetermined amount or more. The condition storage section 32B may be a storage section that doubles as the temporary storage section 22A. The F value may be appended as attribute data to each image.

The correction section 33B performs luminosity correction processing for the images stored in the temporary storage section 22A based on the exposure condition for each image stored in the condition storage section 32B. Specifically, a bright image of the object i.e., an image with a high F value is made brighter, and a dark image of the object i.e., an image with a low F value is made darker.

The storage section 23 stores the moving image formed of the corrected image corrected by the correction section 33B. The display section 28 displays an image before and during the shooting, i.e., a live view image, and displays an image after the shooting.

Figure 12:
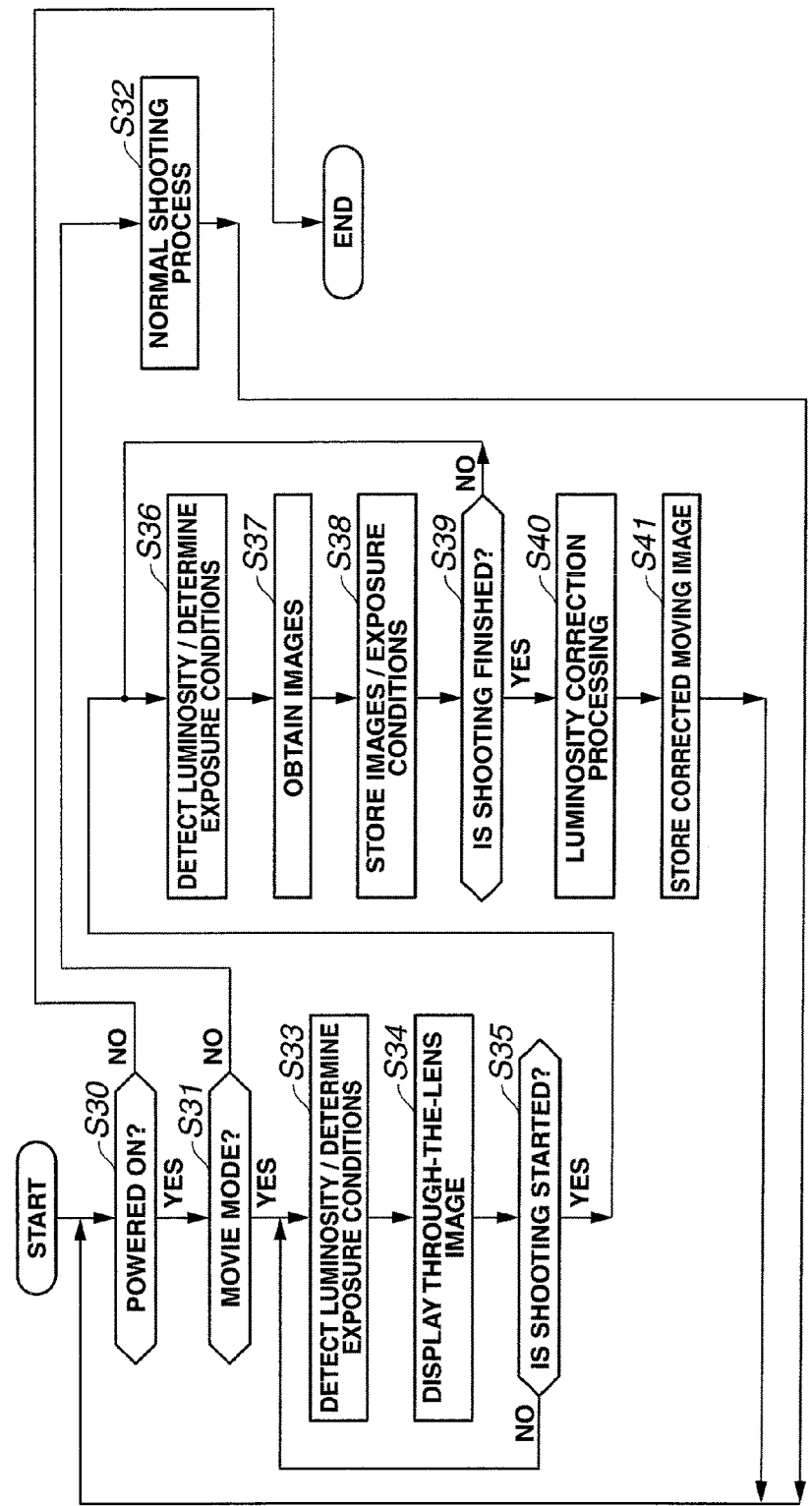
FIG. 12 is a flowchart for describing a flow of operation of the camera in the third embodiment.

Now, a process flow in the camera 1B will be described with reference to a flowchart in FIG. 12.
<Step S30> Power On The operation starts if the camera 1B is powered on (Yes) and ends if the camera 1B is powered off (No).
<Step S31> Initial System Setting If shooting operation mode is movie mode (Yes), a process from S33 is performed. Otherwise (No), a normal process such as a still image shooting process from S32 is performed.

<Steps S33, S34> Detect Luminosity/Set Exposure Conditions

An image of an object picked up by the image pickup section 21 is displayed as a live view image on the display section 28. At this point, the condition control section 31B outputs the exposure correction signal depending on the luminosity of the object detected by the detection section 22B. The condition control section 31B thereby controls the amount of exposure to fall within the dynamic range of the CCD 21A and of a processing circuit (not shown) including an image processing section that processes the signal.

The exposure condition is determined using a known photometric scheme (evaluative metering, center-weighted average metering, or spot metering). For shooting of a person, a correct exposure condition may be set for a face part detected with a face detection system. Further, the user may touch the touch panel displaying the live view image with a finger to cause light in a certain area in the screen to be measured. As another example, the user may sequentially touch two parts in the live view image, causing a correct exposure condition to be set so that the exposure in both of the two designated areas falls within a predetermined range of allowable values (the dynamic range of the CCD 21A).

The dynamic range of the CCD 21A is quite narrow, for example around 2 Ev in an extreme case. With an amount of exposure above the dynamic range, image signals take saturation values. With an amount of exposure below the dynamic range, image signals lack differences in values. Amplifying such image signals would result in what is called rough images with many noise components.

When an object mainly containing a specific color, for example red, is shot, the luminosity (intensity) of red light may exceed the saturation value even though the intensity of white light is below the saturation value. For this reason, in the case of detecting white light, an image signal intensity sufficiently smaller than the saturation value of white light is preferably set as the upper limit of the correct exposure (the dynamic range).

The condition control section 31B controls the diaphragm section 11A so that the F value is varied depending on the luminosity of the object detected by the detection section 22B. Here, with reference to FIGS. 13A to 13D, operation of the condition control section 31B will be described for a case where a moving image of a fish swimming in water is shot from above the surface of the water. At the time T=T0 shown in FIG. 13A, a fish 50 is in a bright area as shown in the display screen 28A. At the time T=T1 shown in FIG. 13B, the fish 50 starts moving to a dark area, and at the time T=T2 shown in FIG. 13C, the fish 50 is in the dark area. While the fish 50 swims from the bright area to the dark area during the time T=T0 to T2, the luminosity distribution of the object including the background significantly changes as shown in FIG. 13D.

Conventional cameras uniformly control electric signals to fall within a predetermined range through automatic exposure control even if the luminosity significantly changes. This is because the image may transition from the state shown in FIG. 13A to the state shown in FIG. 13C or conversely from the state shown in FIG. 13C to the state shown in FIG. 13A, and it is difficult to predict what will occur in the future. As such, real-time control is usually performed to make electric signals fall within a predetermined range of signal levels.

Figure 13E:
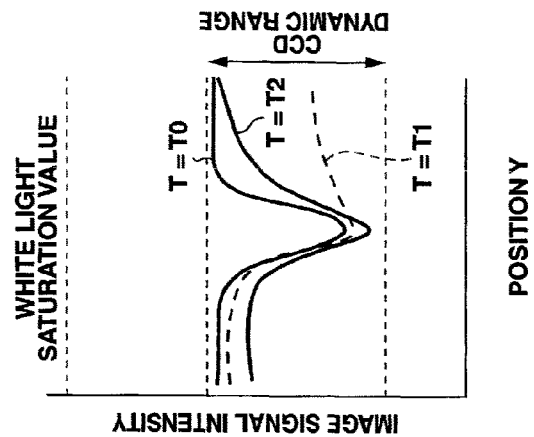
FIG. 13E is an illustrative diagram showing an image signal intensity distribution for describing operation of the condition control section of the camera in the third embodiment.
Figure 13D:
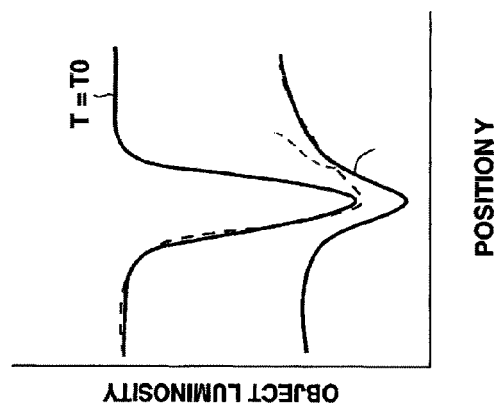
FIG. 13D is an illustrative diagram showing an object luminosity distribution for describing operation of the condition control section of the camera in the third embodiment.
Figure 13A:
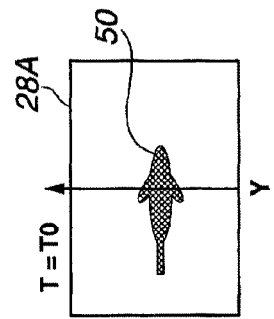
FIGS. 13A to 13C are illustrative diagrams showing display screens for describing operation of a condition control section of the camera in the third embodiment.
Figure 13B:
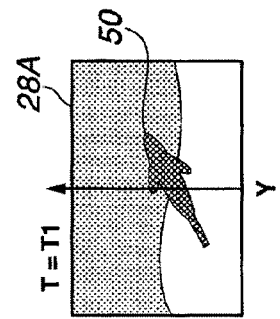
Figure 13C:
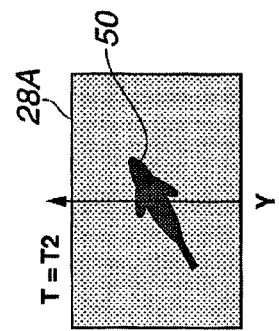

As shown in FIG. 13E, the condition control section 31B controls the diaphragm section 11A depending on the luminosity of the object so that the image pickup signal intensity falls within the dynamic range of the CCD 21A. For example, the condition control section 31B varies the exposure condition such that the F value=8 at the time T=T0, the F value=5.6 at the time T=T1, and the F value=4 at the time T=T2. In this manner, the condition control section 31B narrows the aperture of the diaphragm section 11A to reduce the amount of exposure for a bright object, and widens the aperture to increase the amount of exposure for a dark object.

Recording the exposure control values at the same time allows recognizing how the actual luminosity has changed during the moving image shooting. Specifically, a scene with a large F value can be considered as bright, and a scene with a small F value can be considered as dark. Other exposure control approaches include exposure control by varying the sensitivity (gain), and exposure control by varying the exposure time. In these cases, similarly, a scene with a large gain or a long exposure time can be considered as dark, and a scene with a small gain or a short exposure time can be considered as bright. In this manner, the luminosity at a certain point of time can be detected from the exposure control value, or a luminosity change can be detected from changes in the detected luminosity. Hereinafter, for simplicity of illustration, description will be continued assuming that the exposure is controlled with only the aperture (the F value), by way of example.

<Step S35> Start Shooting Moving Image

If an instruction to start shooting a moving image is given by the user through the operation section 26 (Yes), a moving image shooting process from S38 is started. Otherwise (No), the live view image display process from S33 is repeated, in which the image acquisition and display depending on the luminosity is repeated in real time.

<Step S36> Detect Luminosity/Set Exposure Conditions

The same process as in S33 is performed.

<Step S37> Obtain Images

The image pickup section 21 shoots the object and outputs image signals. As shown in FIG. 13E, the object is shot so that the image signals fall within the dynamic range of the CCD 21A. However, changes in luminosity are not taken into account.

<Step S38> Store Images and Exposure Conditions

The image signals outputted by the image pickup section 21 are stored in the temporary storage section 22A, and the exposure conditions, i.e., the F values, are stored in the condition storage section 32B. The image signals stored in the temporary storage section 22A are preferably stored directly as RGB pixel data, that is, without being converted into images, in order to perform luminosity correction processing after the shooting.

<Step S39> Is Shooting Finished?

The process in steps S38 to S40 is repeated at a predetermined frame rate, for example 60 frames/sec, until the user instructs the finish of the shooting (Yes). That is, sixty images per second are shot.

<Step S40> Luminosity Correction Processing

Once the user instructs the finish of the moving image shooting through the operation section 26, the correction section 33B performs luminosity correction processing for the images stored in the temporary storage section 22A. The luminosity correction processing is performed based on the exposure condition, i.e., the F value at the time of shooting each image, stored in the condition storage section 32B.

For example, in the luminosity correction processing, the average of the F values (an average F value) of all the images is first calculated. Then, the difference between the F value of each image to be corrected and the average F value is calculated. If the calculated F value difference is positive, the image of the object is brighter than the average of the entire moving image, and if the calculated F value difference is negative, the image of the object is darker than the average of the entire moving image. The luminosity correction processing is performed by an amount of correction proportional to the F value difference. Instead of the average, the luminosity correction processing may be performed with reference to the largest F value or the smallest F value.

The luminosity correction processing may not be performed for images for which the calculated F value difference is below a predetermined value. As another example, the images that form the moving image may be divided into nine groups based on the calculated F value differences to perform the luminosity correction processing with nine levels of amounts of correction. In this case, in the nine levels, the first level is a group with the positive and largest F value differences, the fifth level is a group with the smallest absolute values of the F value differences, and the ninth group is a group with the negative and largest F value differences. The correction processing is performed to make first-level images the brightest and ninth-level images the darkest, and is not performed for fifth-level images.

The luminosity correction processing is performed based on an amount of correction proportional to the F value difference. Preferably, a proportionality factor for the F value difference and the amount of correction can be, in other words, the intensity of the correction processing can be user-settable. The relationship between the F value difference and the amount of correction may be based on a function such as a linear function, an exponential function, a logarithmic function, or a more complex predetermined approximate expression function.

Here, by way of example, the luminosity correction processing will be described assuming that the difference of the amount of correction (the amplification rate) between each of the nine levels is "1.2." With the difference of the amount of correction "1.2," a viewer is not likely to notice gradual changes (correction steps) caused by the correction, so that the luminosity correction processing providing a natural feel can be realized.

In the correction processing with the difference of the amount of correction "1.2," a fourth-level image, which is one level brighter than the fifth level, has its image signal intensity corrected by 1.2 times. A third-level image is subjected to amplification correction by "1.2×1.2=1.44" times. Similarly, a second-level image is subjected to amplification correction by 1.73 times, and a first-level image is subjected to amplification correction by 2.01 times.

Conversely, for an image with the sixth-level exposure control, which is one level darker than the fifth level, the luminosity correction processing is performed at "1/1.2 times" the amplification rate. For a seventh-level image, the luminosity correction processing is performed at "1/1.44 times" the amplification rate. For an eighth-level image, the luminosity correction processing is performed at "1/1.73 times" the amplification rate. For a ninth-level image, the luminosity correction processing is performed at "1/2.01 times" the amplification rate.

Since the luminosity is further halved for a dark image and doubled for a bright image, the user can clearly feel changes in luminosity.

The luminosity correction processing prevents the images that form the moving image from being rendered with uniform luminosity, so that a dark scene can be felt to be darker and a bright scene can be felt to be brighter. Appropriately selecting the difference of the amount of correction between each level makes the correction steps less noticeable, allowing enhanced realism and expression.

Depending on the user's selection, the correction may be performed to make changes more noticeable even if the correction steps are unnatural. For example, three-times amplification correction may be performed for first-level images for making the images seem very bright.

As described above, the correction section 33B performs the luminosity correction processing for increasing or decreasing the luminosity of each image that forms the moving image based on the deviation of the exposure condition of the image from the average.

Figure 15:
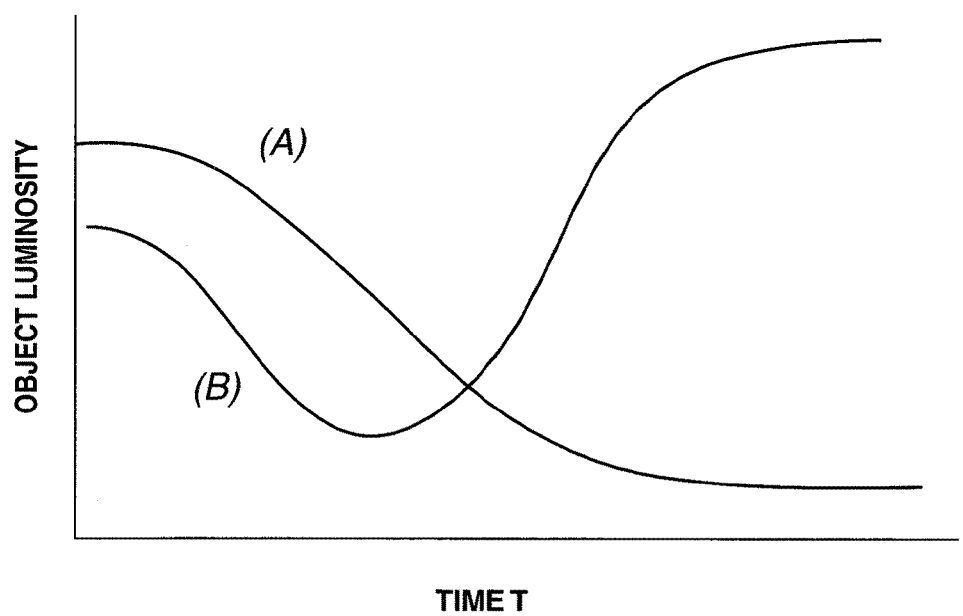
FIG. 15 is a diagram for describing changes in luminosity of an object during shooting of a moving image.

Among the images that form the moving image, the correction section 33B preferably corrects the luminosity of an image in which the object is the brightest to a predetermined highest luminosity. The predetermined highest luminosity here is, for example, the upper limit value of the dynamic range of the corrected images. In shooting the moving image of the fish as shown in FIG. 13, the luminosity of the object simply decreases as shown in FIG. 15A. However, the luminosity may complicatedly change as shown in FIG. 15B. In the case of a moving image in which the luminosity of an object simply decreases, the luminosity of the initial image may be corrected to be the highest luminosity. However, in the case of a moving image in which the luminosity changes as shown in FIG. 15B, correcting the luminosity of the initial image to be the highest luminosity results in that the luminosity of subsequent brighter images can only be corrected to the same highest luminosity as the initial image. Therefore changes in luminosity of the object cannot be reproduced.

In contrast, among the images that form the moving image, the luminosity of an image in which the object is the brightest is corrected to the predetermined highest luminosity. This allows changes in luminosity of the object to be more accurately reproduced. That is, a moving image closer to what is seen with the naked eye can be obtained throughout the moving image.

The predetermined highest luminosity may be set to a value based on the dynamic range of the corrected images, for example 90% of the upper limit value.

Rather than simply taking into account the highest/lowest luminosity or the maximum/minimum of the amount of exposure, the correction preferably also takes into account which exposure condition has been used for the longest time during the shooting (has been used for the largest number of images).

The correction processing is not performed for images under the fifth-level exposure condition (the average exposure condition). Further, if images shot under the same exposure condition continue over half or ⅔ of the entire moving image, these images may be considered as images according to the user's intention and may not be subjected to the correction processing.

The correction processing may be performed for only the starting part and ending part of the moving image and not for the middle part. That is, depending on the user's selection/setting, groups of images to be subjected to the correction processing may be selectable, or the degree of correction processing may be variable among groups of images. The user can obtain a moving image rendered according to the user's intention.

The luminosity correction processing is also dynamic range expansion processing. A dynamic range of a device, such as a television, used by the user to view the moving image (a display unit dynamic range) is wider than the dynamic range of the CCD 21A. Therefore, as shown in FIG. 14B, the correction section 33B performs the correction processing for making a bright area brighter and a dark area darker within the range of the display unit dynamic range, in other words, within a predetermined corrected dynamic range. This allows generating a moving image closer to what is seen with the naked eye. Since the images shot within the dynamic range of the CCD 21A have a good color balance, a moving image with colors closer to what is seen with the naked eye can be obtained. The display unit dynamic range depends on factors such as the type of the display unit. As such, the corrected dynamic range, i.e., the highest luminosity/lowest luminosity after the luminosity correction processing are preferably determined by the user's selection from a number of predetermined values.

Figure 14A:
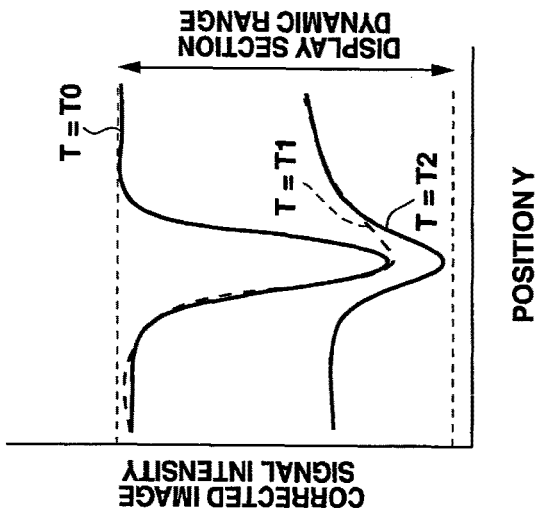
FIG. 14A is an illustrative diagram showing an image signal intensity distribution for describing operation of a correction section of the camera in the third embodiment.
Figure 14B:
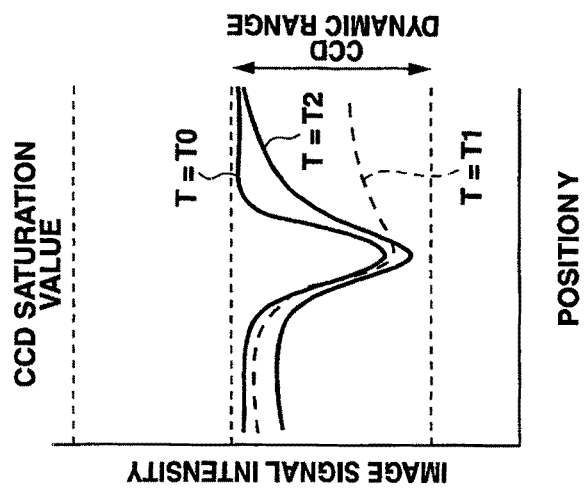
FIG. 14B is an illustrative diagram showing a corrected image signal intensity distribution for describing operation of the correction section of the camera in the third embodiment.

Thus, the correction section 33B performs the luminosity correction processing and the dynamic range expansion processing for the images with the image signal intensities shown in FIG. 14A stored in the temporary storage section 22A. Then the images with corrected image signal intensities shown in FIG. 14B can be obtained.

The corrected image signal intensities shown in FIG. 14B are close to the object luminosity distribution shown in FIG. 13D, thus close to what is seen with the naked eye.

<Step S41> Store Corrected Moving Image

The moving image formed of the images subjected to the luminosity correction processing by the correction section 33B is stored in the storage section 23. Known data compression processing may be performed before storage.

Thus, a method for controlling a shooting apparatus in the present embodiment includes: a detection step of detecting luminosity of an object; a condition control step of controlling an exposure condition depending on the luminosity of the object detected in the detection step; a shooting step of shooting the object at a predetermined frame rate under control in the condition control step and outputting a moving image formed of a plurality of images; a condition storage step of storing a value of the exposure condition for each of the images; and a correction step of performing luminosity correction processing based on the value of the exposure condition for each of the images stored in the condition storage step.

As described above, the camera 1B, which is a shooting apparatus in the present embodiment, provides a moving image closer to what is seen with the naked eye because of the luminosity correction processing performed by the correction section 33B. Also, the camera 1B provides a moving image closer to what is seen with the naked eye throughout the moving image.

For simplicity of illustration, the above description has employed the aperture value (the F value) of the diaphragm section 11A as the exposure correction signal, which is the exposure condition, by way of example. Other exposure conditions may also be employed, such as the shutter speed, or the amplification rate used in the amplification processing for image pickup signals performed by the AGC control section 35B. Since the image pickup sensitivity can be increased or decreased by processing of adding pixels or thinning out pixels, a control value of such processing may be employed as an exposure condition. In an actual camera, the above various exposure control schemes are usually combined to determine exposure conditions, and the exposure correction signal as the exposure condition is calculated based on control values of several exposure control schemes.

Fourth Embodiment

Now, a camera 1C, which is a shooting apparatus in a fourth embodiment of the present invention, will be described. Since the camera 1C is similar to the camera 1B, like components will be given like symbols and will not be described.

Figure 16:
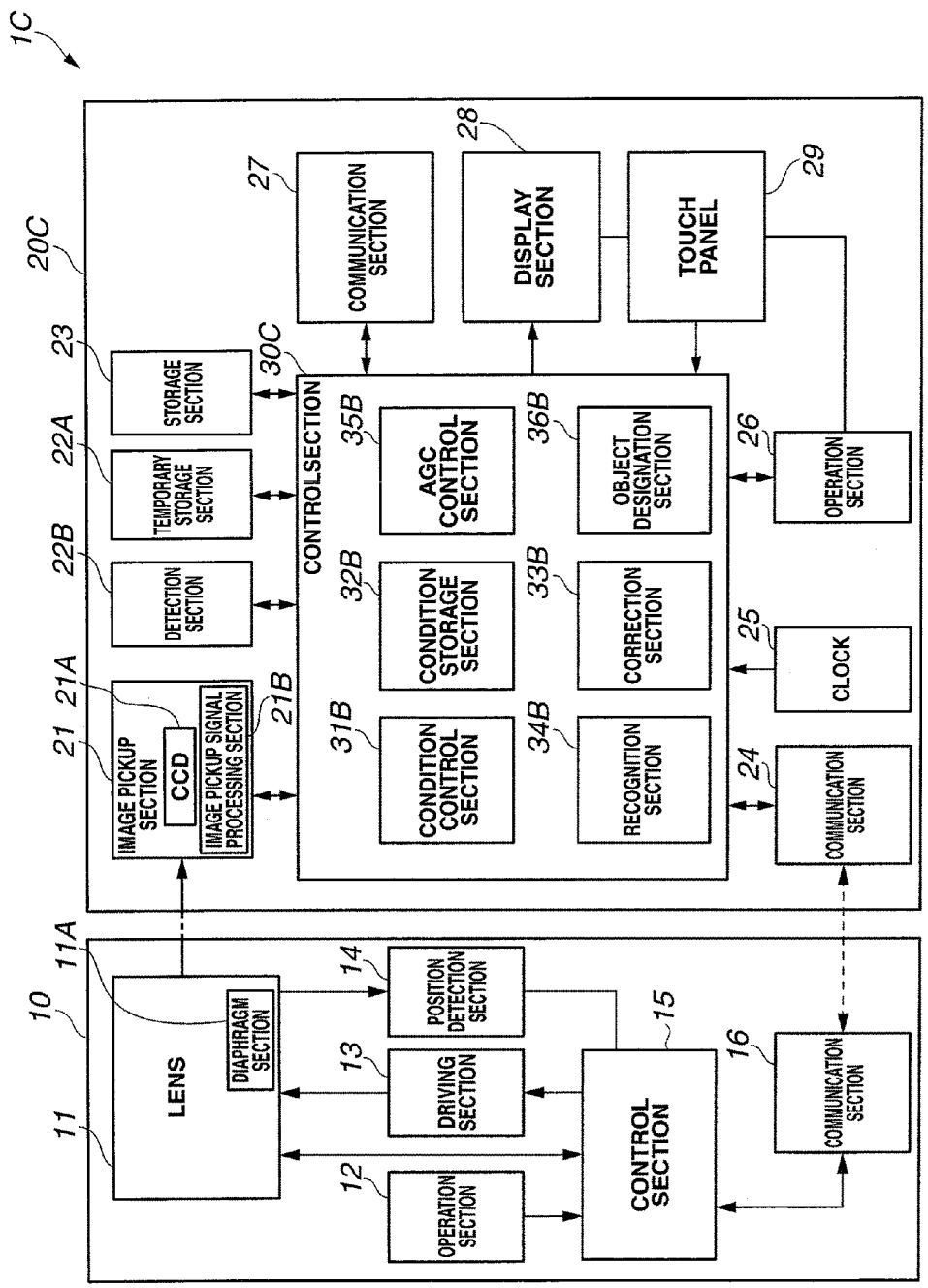
FIG. 16 is a schematic diagram of a camera in a fourth embodiment.

As shown in FIG. 16, the camera 1C includes an object designation section 36B that is object designation means, and a recognition section 34B that is recognition means, in a control section 30C in a body 20C. The object designation section 36B allows a user to designate a specific object through a touch panel based on an object image displayed on a display section 28. The recognition section 34B recognizes an image of the specific object in the object image displayed on the display section 28.

Figure 17:
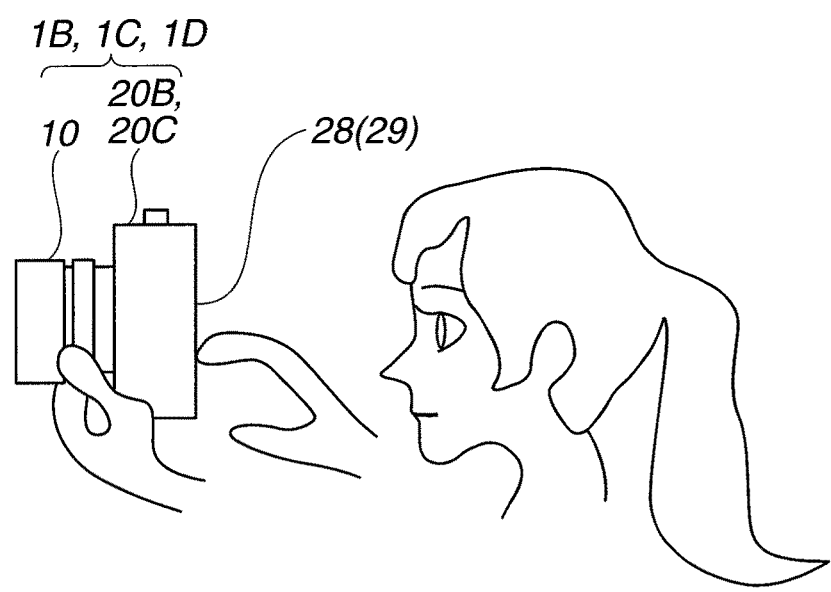
FIG. 17 is an illustrative diagram for describing designating a specific object in the camera in the fourth embodiment.

As in a case where the sun setting over the horizon is shot with a camera fixed on a tripod, an object of shooting may move in the screen over time. Further, the sun is very bright compared with the sky in the background. In such a case, as shown in FIG. 17, the user designates the sun 51 as the specific object in a live view image on the camera 1C by touching a touch panel 29 with a finger before starting the shooting. Then the moving image shooting is started while a condition control section 31B controls the exposure state to be optimum for the sun.

Figure 18E:
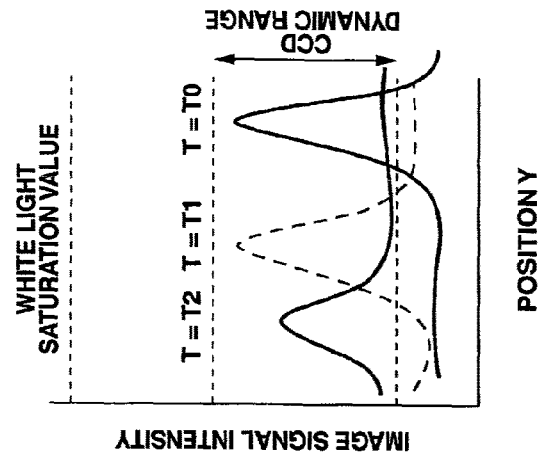
FIG. 18 is an illustrative diagram for describing shooting a moving image in the camera in the fourth embodiment.
Figure 18D:
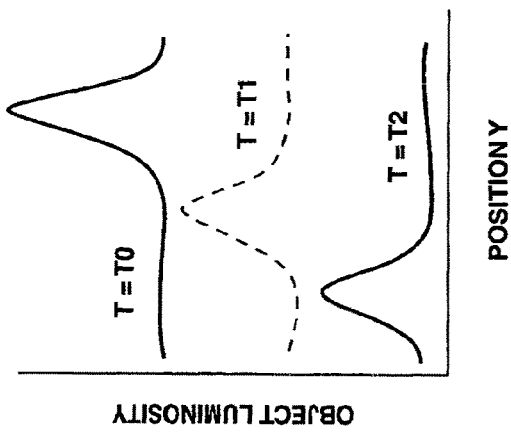
Figure 18A:
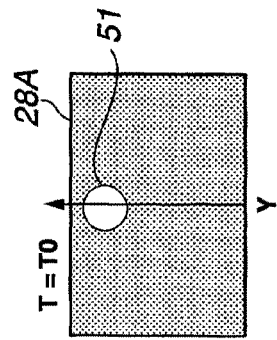
Figure 18B:
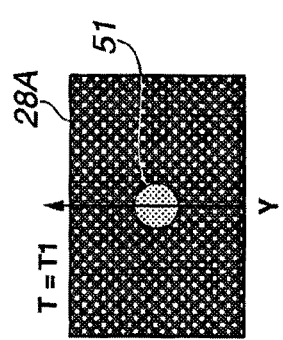
Figure 18C:
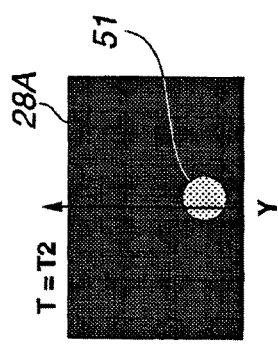

As shown in FIGS. 18A to 18C, the sun 51 moves from an upper part to a lower part in the display screen during the time T=T0 to T2, and the luminosity of the sky in the background as well as the luminosity of the sun 51 decrease. Thus, as shown in FIG. 18D, the luminosity changes significantly. In addition, the sun is very bright compared with the background.

In the camera 1C, the recognition section 34B detects the part of the sun 51 in the shot images, and the condition control section 31B controls the exposure state to be always optimum for the sun 51. That is, as shown in FIG. 18E, through the control by the condition control section 31B using the F value based on the luminosity of the sun 51, the image signal intensities of the sun in the images fall within the dynamic range of a CCD 21A. However, the changes in luminosity are small, resulting in colors different from what is seen with the naked eye.

Figure 19:
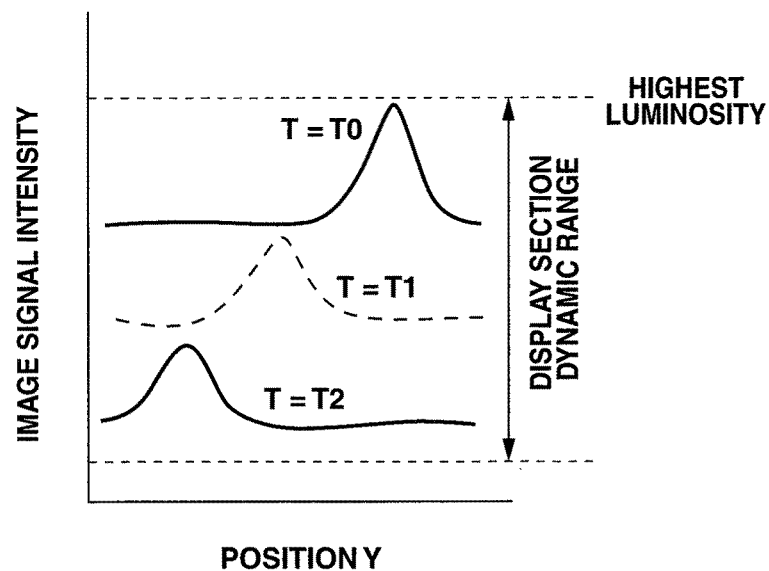
FIG. 19 is an illustrative diagram for describing luminosity correction processing in the camera in the fourth embodiment.

As shown in FIG. 19, in the camera 1C, a correction section 33B performs the luminosity correction processing after the shooting as in the camera 1B in the third embodiment so that the intensities fall within a display unit dynamic range. This allows obtaining a moving image in which changes such as in luminosity and color of the sun (the specific object) are close to what is seen with the naked eye.

The object designation section 36B identifies the shape, color, or brightness specific to the object image in the area designated by the user through the touch panel 29, and detects how the position of similar patterns in the sequentially obtained images moves.

When the specific object designated by the object designation section 36B disappears from the screen during the shooting, for example when the sun sets below the horizon, the camera 1C informs the user and asks the user for determination whether to continue or stop the shooting.

As described above, in addition to the advantages of the camera 1B, the camera 1C in the present embodiment provides an advantage of the ability to shoot a moving image that matches the user's intention with attention focused on a specific object in a small part of the screen.

In shooting a sunset scene, image signal intensities of only red light are high. Accordingly, red image signals may exceed the saturation value of a CCD 21 even though they are below the upper limit value of the dynamic range of the CCD 21 that is set lower by a predetermined value based on the saturation value of white light.

Therefore, in shooting the sunset, it is preferable to use a camera having a detection section that separately detects the luminosity of red, green, and blue light rather than the luminosity of white light. In this case, the condition control section 31B controls the F value so that the intensities of light of all the three colors are below the respective saturation values. In this manner, the intensities can be controlled to fall within the dynamic range of the CCD 21A even if the intensities of only a specific color are high.

Fifth Embodiment

Now, a camera 1D capable of shooting moving images, which is a shooting apparatus in a fifth embodiment, will be described below. The camera 1D has both the functions of the camera 1 in the first embodiment and the functions of the camera 1B in the third embodiment.

Thus, the camera 1D includes: a detection section that detects luminosity of an object; a shooting section that outputs images of the object; a condition control section that controls an exposure condition to fall within a dynamic range of the shooting section depending on the luminosity of the object detected by the detection section; a moving image shooting control section that controls the shooting section to repeat shooting under different predetermined shooting conditions at a predetermined frame rate; a condition storage section that stores a value of the exposure condition for each of the images; a correction section that performs luminosity correction processing based on the value of the exposure condition for each of the images stored in the condition storage section; a moving image generation section that generates moving images based on the corrected images shot under the predetermined shooting conditions, respectively; an image extraction section that extracts a first image and a second image based on a predetermined condition from each of the moving images; a display section; and a display control section that performs control to simultaneously multi-display the first image and the second image of each moving image on the display section.

The camera 1D provides both the advantages of the camera 1 in the first embodiment and the advantages of the camera 1B in the third embodiment.

Therefore, in addition to the moving image shooting without overexposure, the correction of changes in luminosity during the shooting is performed. This enables acquisition of a moving image capable of dynamic rendering with respect to changes in color and luminosity.

For example, a camera as follows can be provided. In shooting the sunset, a moving image that reproduces the color of the sun can be shot without overexposing the sun. Further, when the sun sets and darkness comes, the scene can be rendered as an image of deep darkness without setting a uniform exposure condition.

The foregoing description has been made for the cameras that are shooting apparatuses, by way of example. It is to be understood that the present invention is also applicable to mobile devices and home electric appliances with a moving image shooting function and a display function.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A shooting apparatus, comprising:
a shooting section that outputs images of an object;
a moving image shooting control section that controls the shooting section to repeat shooting under a plurality of different predetermined shooting conditions at a predetermined frame rate in a multi-movie mode;

a moving image generation section that generates a plurality of movies, each including moving images, based on a plurality of images previously shot under the predetermined shooting conditions, respectively;

an image analysis section that analyzes, for each of the previously generated plurality of movies, brightness values of a plurality of colors of each of the plurality of images that form each of the previously generated plurality of movies;

an image extraction section that extracts a first image and a second image from each of the plurality of previously generated movies based on the brightness value analysis by the image analyzing section;

a display section; and a display control section that performs control to simultaneously multi-display the first image and the second image of each of the previously generated plurality of movies on the display section.

2. The shooting apparatus according to claim 1, wherein the brightness values of the plurality of colors are red, green, and blue brightness values.

3. The shooting apparatus according to claim 2, wherein the display control section performs control to simultaneously multi-display a live view image under each of the plurality of different predetermined shooting conditions on the display section at the time of shooting.

4. The shooting apparatus according to claim 2, further comprising:

a storage section that stores a moving image selected from the plurality of moving images generated by the moving image generation section.

5. The shooting apparatus according to claim 4, further comprising:

a manual selection section through which a user selects anyone of the moving images based on the first image and the second image displayed on the display section, wherein the moving image selected through the manual selection section is stored in the storage section or displayed by the display control section on the display.

6. The shooting apparatus according to claim 4, further comprising:

an automatic selection section that automatically selects one of the plurality of moving images based on a predetermined condition, wherein the storage section stores the moving image selected by the automatic selection section.

7. The shooting apparatus according to claim 2, wherein the image extraction section extracts the first image and the second image from each of the plurality of moving images according to a brightness change in a certain area or a certain object.

8. The shooting apparatus according to claim 2, wherein the image extraction section extracts the first image with a highest maximum brightness value and the second image with a lowest minimum brightness value from each of the plurality of moving images.

9. The shooting apparatus according to claim 8, wherein the image analysis section analyzes, in each image, brightness values of the certain area or the certain object designated by a user through a touch panel.

10. The shooting apparatus according to claim 6, wherein the automatic selection section automatically selects; from the plurality of moving images, the moving image such that the brightness values of the first image are below a saturated brightness value.

11. A method for controlling a shooting apparatus, comprising:

a shooting step, by a shooting section under control of a moving image shooting control section, of repeating, at a predetermined frame rate, a first shooting substep of outputting images of an object under a first shooting condition, a second shooting substep of outputting images of the object under a second shooting condition, and a third shooting substep of outputting images of the object under a third shooting condition in a multi-movie mode;

a moving image generation step, by a moving image generation section, of generating a first movie based on a plurality of images previously shot in the first shooting substep, generating a second movie based on a plurality of images previously shot in the second shooting substep, and generating a third movie based on a plurality of images previously shot in the third shooting substep;

an image analysis step of analyzing, for each of the previously generated first, second and third movies, brightness values of a plurality of colors of each of the plurality of images that forms the previously generated first, second and third movies;

an image extraction step, by an image extraction section, of extracting a first image and a second image from each of the previously generated first, second and third movies based on a result by the image analyzing section; and a display control step, by a display control section, of simultaneously multi-displaying the first image and the second image of each of the previously generated first, second and third movies on a display section.

12. The method for controlling a shooting apparatus according to claim 11, wherein the brightness values of the plurality of colors are red, green, and blue brightness values.

13. The method for controlling a shooting apparatus according to claim 12, wherein in the image extraction step, the first image having a highest maximum brightness value and the second image having a lowest minimum brightness value are extracted from each of the plurality of moving images.

14. The shooting apparatus according to claim 1, wherein the image extraction section extracts a first image having a highest maximum brightness and a second image having a lowest maximum brightness from each of the plurality of previously generated movies based on the brightness value analysis by the image analyzing section.

15. The method for controlling a shooting apparatus according to claim 11, wherein during the image extraction step, the image extraction section extracts a first image having a highest maximum brightness and a second image having a lowest maximum brightness from each of the previously generated first, second and third movies based on the brightness value analysis by the image analyzing section.

* * * * *